A. I. AMBLER,
Assignor, by mesne assignments, to THE INTERNATIONAL VAPOR FUEL CARBON IRON MANUFACTURING CO.
PROCESS OF AND APPARATUS FOR GENERATING GAS FROM PETROLEUM.
No. 9,874. Reissued Sept. 13, 1881.
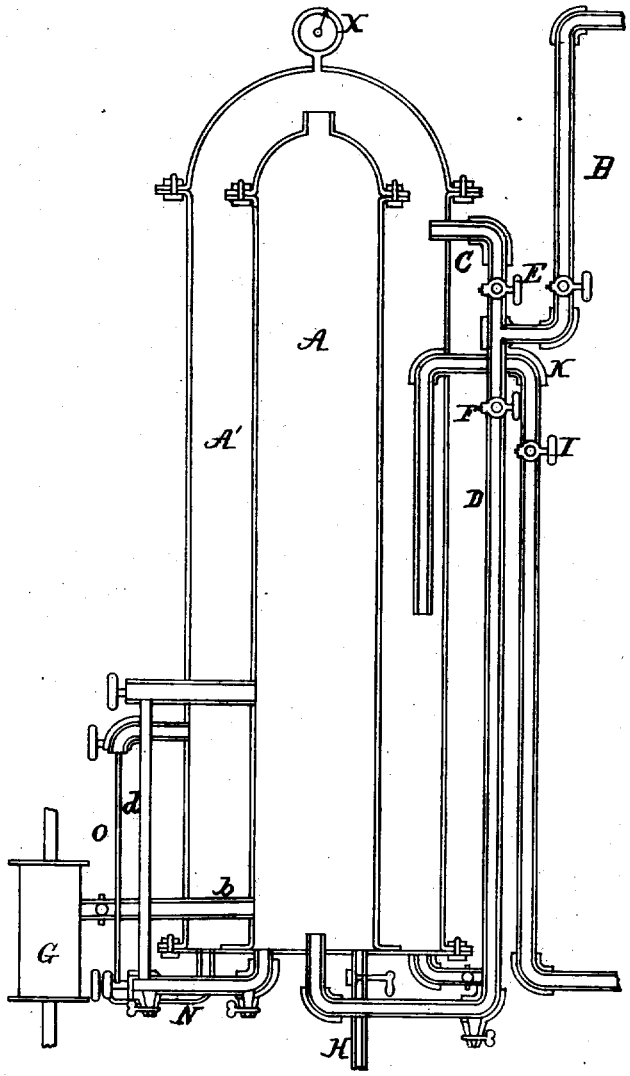
WITNESSES
F. M. Burnham.
Daniel Breed
INVENTOR
A. I. Ambler.
by C. S. Whitman. ATTORNEY.
N. PETERS, Photo-Lithographer, Washington, D. C.

UNITED STATES PATENT OFFICE.

AUGUSTIN I. AMBLER, OF WASHINGTON, DISTRICT OF COLUMBIA, ASSIGNOR, BY MESNE ASSIGNMENTS, TO THE INTERNATIONAL VAPOR FUEL CARBON IRON MANUFACTURING COMPANY, OF SAME PLACE.

PROCESS OF AND APPARATUS FOR GENERATING GAS FROM PETROLEUM.

SPECIFICATION forming part of Reissued Letters Patent No. 9,874, dated September 13, 1881.

Original No. 118,575, dated August 29, 1871. Application for reissue filed April 25, 1881.

DIVISION B.

*To all whom it may concern:*

Be it known that I, AUGUSTIN I. AMBLER, of Washington, in the District of Columbia, have invented certain new and useful Improvements in Process of and Apparatus for Generating Gases from Liquid Hydrocarbons; and I do hereby declare the following to be a full, clear, and exact description of the invention, that will enable others skilled in the art to which it appertains to make and use the same, reference being had to the accompanying drawing, and to the letters of reference marked thereon, which forms a part of this specification.

My invention consists in generating vapor or gas from oil or liquid hydrocarbons by means of steam and uniting the resultant vapor or gas with other steam.

It also consists in an apparatus for carrying this process into operation, involving novel combinations of parts.

In the accompanying drawing, illustrating the apparatus, A is the inner chamber, and A′ the outer chamber.

B designates the steam-pipe for conveying steam from the source of supply, which is provided with branch pipes C and D, communicating respectively with the outer and inner chamber. The flow of steam through the pipe C, entering the outer chamber, A′, is regulated by the valve E, and the flow of steam through the pipe D, entering the bottom of the inner chamber, A, is regulated by the valve F.

The liquid hydrocarbon may be supplied to the inner chamber, A, through a pipe, *b*, entering the same at a point near and a little above the point at which the steam enters by means of the force-pump G, and a valve may be made use of for regulating the velocity with which the oil flows through the pipe *b*.

When the process is so conducted that a residuum remains in the inner chamber it may be drawn off through the pipe H.

The amount of hydrocarbon liquid in the inner chamber is indicated by the gage *d*. The process is so conducted that the jet of steam entering the pipe C, in striking the falling hydrocarbon injected through the pipe *b*, entirely vaporizes it and carries it upward without having residual matter in the bottom of the said inner chamber.

The pressure of steam within the apparatus is indicated by the steam-gage *x*, and regulated by the valve I in the pipe K, through which the vapor flows from the apparatus to the burner. These are highly important features of construction, as it is necessary that the pressure of vapor should be determined with accuracy and regulated with precision. The gage *o*, communicating with the outer chamber, A′, will indicate any condensed matter in the latter, which may be readily drawn off by the pipe N. If the valve F is open and the valve E closed, the steam will enter the inner chamber at a point just under the tube *b*, through which the hydrocarbon liquid enters, and vaporize the hydrocarbon in a manner dependent on the heat of the entering steam and the nature of the hydrocarbon used in the process. The vapor, after being thus generated, will pass upward into the outer chamber, where it may be held under pressure by means of the valve I in the tube K until it is drawn off for use through the latter. If the valve F is closed and the valve E open, the steam enters the outer chamber, A′, heats the same, and expands into the inner chamber, A, where it may be held under pressure, as before described. If both valves F and E are open, the entering steam in the inner chamber, A, meeting the inflow of oil from the pipe *b*, or the liquid hydrocarbon which has already accumulated in the bottom of the chamber, converts the liquid into vapor, which flows upward into the outer chamber, where it meets another current of steam entering through the pipe C, and becomes mixed and combined therewith under pressure in such a manner as to form an inflammable gas or vapor. This supply of steam is regulated with precision by a stop-cock, so that it may be compounded with the vapor generated from the hydrocarbon in the exact proportions required to produce the best results.

Having thus described my invention, I claim and desire to secure by Letters Patent—

1. The improvement in the art of manufacturing gas or vapor from liquid hydrocarbons, which consists in introducing steam into an outer chamber and mixing the same under pressure with gases or vapors generated in an inner chamber, as and for the purposes described.

2. The vapor-generator provided with an oil-supply pipe and with a steam-pipe below and near the same, whereby the steam is caused to impinge directly upon the entering hydrocarbon, as and for the purposes described.

3. The combination of the steam-supply pipe, the outer chamber, and the generator, as and for the purposes described.

4. In the apparatus for generating vapor from liquid hydrocarbons described, the steam-supply pipe having two branches opening into the generator, for supplying steam to different parts of the apparatus, as and for the purposes described.

5. In the apparatus described for generating vapor from liquid hydrocarbon, the vapor-generator having a steam-jacket surrounding and communicating therewith, and provided with a steam-supply pipe, as and for the purposes described.

6. In the apparatus described for generating vapor from liquid hydrocarbons, a vapor-generator surrounded on all sides, except its base, by a gas-receiver, as and for the purposes described.

7. The combination of the outer chamber, the inner chamber, and the pipes communicating with the steam-supply, whereby the steam may be made to flow either into the outer or inner chamber, or both chambers, as may be desired.

In testimony whereof I affix my signature in presence of two witnesses.

A. I. AMBLER.

Witnesses:
F. M. BURNHAM,
I. B. ARCHER.